(12) United States Patent
Yue et al.

(10) Patent No.: US 11,175,541 B2
(45) Date of Patent: Nov. 16, 2021

(54) DISPLAY SUBSTRATE AND PREPARATION METHOD THEREFOR, DISPLAY PANEL AND DISPLAY DEVICE

(71) Applicant: BOE Technology Group Co., Ltd., Beijing (CN)

(72) Inventors: Yang Yue, Beijing (CN); Hongrun Wang, Beijing (CN); Qi Yao, Beijing (CN); Tong Yang, Beijing (CN); Xiang Li, Beijing (CN); Yong Yu, Beijing (CN); Haitao Huang, Beijing (CN); Chuanxiang Xu, Beijing (CN); Feng Liao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/264,826

(22) PCT Filed: May 29, 2020

(86) PCT No.: PCT/CN2020/093414
§ 371 (c)(1),
(2) Date: Jan. 31, 2021

(87) PCT Pub. No.: WO2020/248846
PCT Pub. Date: Dec. 17, 2020

(65) Prior Publication Data
US 2021/0294143 A1 Sep. 23, 2021

(30) Foreign Application Priority Data
Jun. 14, 2019 (CN) .......................... 201910516305.0

(51) Int. Cl.
*G02F 1/1339* (2006.01)
*G02F 1/1337* (2006.01)

(52) U.S. Cl.
CPC ........ *G02F 1/13398* (2021.01); *G02F 1/1337* (2013.01); *G02F 1/13378* (2013.01); *G02F 1/133707* (2013.01); *G02F 1/133723* (2013.01)

(58) Field of Classification Search
CPC ............. G02F 1/13398; G02F 1/13378; G02F 1/133723; G02F 1/1337
See application file for complete search history.

(56) References Cited

U.S. PATENT DOCUMENTS 11,036,102 B1 * 6/2021 Xiong ................... G02F 1/1339

* cited by examiner

*Primary Examiner* — Phu Vu
(74) *Attorney, Agent, or Firm* — IPro, PLLC

(57) ABSTRACT

A display substrate and a preparation method therefor, a display panel and a display device. The display substrate includes a plurality of pixel regions arranged in an array. The display substrate includes: a base; pixel electrodes provided on the base and located in the pixel regions; separation columns provided on the base and located between two adjacent pixel regions in the row direction, side surfaces of the separation columns having hydrophobic characteristics; and an alignment film provided on the pixel electrodes and located in the pixel regions, where edges of two opposite sides of the alignment film in the row direction are in contact with a side surface of the separation columns, and a surface of the alignment film on a side facing away from the base has a shape of gradually protruding from both sides toward the middle in the row direction.

18 Claims, 11 Drawing Sheets

DISPLAY SUBSTRATE AND PREPARATION METHOD THEREFOR, DISPLAY PANEL AND DISPLAY DEVICE

CROSS-REFERENCE TO RELATED APPLICATION

The present disclosure is a US National Stage of International Application No. PCT/CN2020/093414, filed on May 29, 2020, which claims the priority of the Chinese patent application filed to the Chinese Patent Office on Jun. 14, 2019 with the application number 201910516305.0, and the title "ARRAY SUBSTRATE AND PREPARATION METHOD THEREOF, AND DISPLAY PANEL", the entire content of which is incorporated herein by reference.

FIELD

The present disclosure relates to the technical field of display, in particular to a display substrate and a preparation method therefor, a display panel and a display device.

BACKGROUND

In a display panel in an Advanced Super Dimension Switch (ADS) mode, an electric field between a data line and a common electrode will cause light leakage on both sides of the data line. In order to reduce the light leakage on both sides of the data line, a common method is to increase a width of a corresponding black matrix, which will result in a decrease in an aperture ratio of the display panel.

SUMMARY

An embodiment of the present disclosure provides a display substrate, including:
a base including a plurality of pixel regions arranged in an array;
pixel electrodes arranged in the pixel regions;
spacers each located between two adjacent pixel regions in a row direction, where side surfaces of the spacers have hydrophobic characteristics; and
orientation films arranged in the pixel regions and on a side, facing away from the base, of the pixel electrodes; where edges of two opposite sides, in the row direction, of an orientation film arranged in a pixel region are in contact with side surfaces of spacers adjacent to the pixel region, and a surface on a side, facing away from the base, of the orientation film has a shape of gradually protruding from both sides toward the middle in the row direction.

Optionally, a thickness of the orientation film tends to gradually increase from both sides toward the middle in the row direction.

Optionally, each of the spacers includes a Black Photo Spacer (BPS) layer located on the base and a hydrophobic material layer located on an outer surface of the BPS layer.

Optionally, a material of the hydrophobic material layer includes Teflon.

Optionally, the display substrate further includes adjustment layers arranged in the pixel regions and between the pixel electrodes and the orientation films; where edges of two opposite sides, in the row direction, of an adjustment layer arranged in the pixel region are in contact with the side surfaces of the spacers adjacent to the pixel region, and a surface, in contact with the orientation film, of the adjustment layer has a shape of gradually recessing from both sides toward the middle in the row direction.

Optionally, a thickness of the adjustment layer tends to gradually decrease from both sides toward the middle in the row direction.

Optionally, a material of the adjustment layer includes a hydrophobic material.

Optionally, each of the pixel electrodes includes a plurality of electrode strips arranged at intervals.

An embodiment of the present disclosure further provides a method for preparing a display substrate, and the method includes:
forming pixel electrodes in pixel regions on a base;
forming spacers each between two adjacent pixel regions in a row direction, where side surfaces of the spacers have hydrophobic characteristics; and
forming orientation films arranged on the pixel electrodes in the pixel regions, where edges of two opposite sides, in the row direction, of an orientation film arranged in a pixel region are in contact with side surfaces of spacers adjacent to the pixel region, and a surface on a side, facing away from the base, of the orientation film has a shape of gradually protruding from both sides toward the middle in the row direction.

Optionally, the forming the spacers each between the two adjacent pixel regions in the row direction specifically includes:
forming BPS layers each between the two adjacent pixel regions in the row direction; and
forming hydrophobic material layers on outer surfaces of the BPS layers.

Optionally, a material of the hydrophobic material layer includes Teflon.

Optionally, the orientation film is formed by a transfer process.

Optionally, the forming the orientation films located on the pixel electrodes in the pixel regions specifically includes:
forming first sub-orientation films on the pixel electrodes arranged in the pixel regions by an imprinting process;
forming polyimide solutions on the first sub-orientation films by a transfer process; and
forming the orientation films by heating the first sub-orientation films and the polyimide solutions.

Optionally, before forming the orientation films arranged on the pixel electrodes in the pixel regions, the method further includes:
forming adjustment layers located on the pixel electrode in the pixel regions, where edges of two opposite sides, in the row direction, of an adjustment layer arranged in the pixel region are in contact with the side surfaces of the spacers adjacent to the pixel region, and a surface, in contact with the orientation film, of the adjustment layer has a shape of gradually recessing from both sides toward the middle in the row direction.

Optionally, a material of the adjustment layer includes a hydrophobic material.

Optionally, the adjustment layer is formed by adopting a coating process.

An embodiment of the present disclosure further provides a display panel including the display substrate as described above.

An embodiment of the present disclosure further provides a display device including the display panel as described above.

DETAILED DESCRIPTION OF THE EMBODIMENTS

To further clarify the object, the technical solution and the advantages of the present disclosure, embodiments in the present disclosure will be described in detail below in conjunction with the accompanying drawings. It should be noted that, in the case of no conflict, the embodiments in the present application and the features in the embodiments may be combined with each other randomly.

Figure 1:
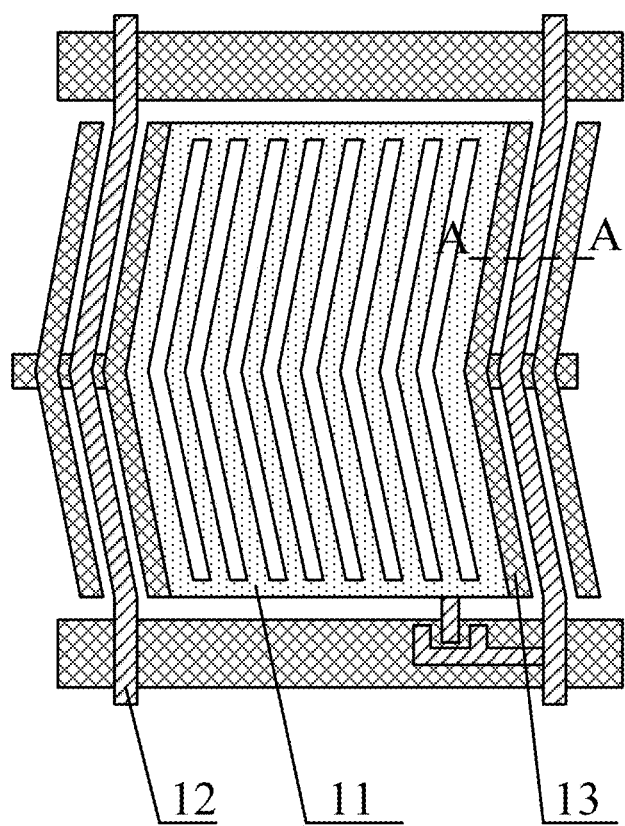
FIG. 1 illustrates a schematic diagram of a display panel in an ADS mode.
Figure 2:
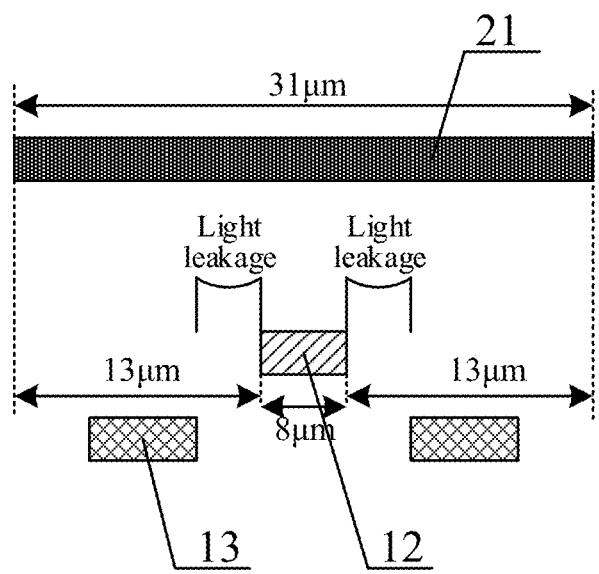
FIG. 2 illustrates a cross-sectional view of A-A in FIG. 1.

FIG. 1 illustrates a schematic diagram of a display panel in an ADS mode, and FIG. 2 illustrates a cross-sectional view of A-A in FIG. 1. As shown in FIG. 1 and FIG. 2, a display panel in an ADS mode includes a display substrate and a color film substrate which are arranged oppositely. A pixel electrode 11, data lines 12 and common electrodes 13 are located on the display substrate, and the pixel electrode 11, the data lines 12 and the common electrodes 13 are respectively located on different layers. A black matrix 21 is located on the color film substrate, and the black matrix 21 is used for shielding light leakage. Voltage differences are present between the data line 12 and the pixel electrode 11, and between the data line 12 and the common electrode 13, so that electric fields are present between the data line 12 and the pixel electrode 11, and between the data line 12 and the common electrode 13. The electric field between the data line 12 and the common electrode 13 can cause light leakage on both sides of the data line 12. In order to reduce light leakage on both sides of the data line, a common method is to increase a width of the corresponding black matrix 21, so that the width of the black matrix needs to reach 31 μm or above. The black matrix with such a width results in a decrease in an aperture ratio of the display panel.

Figure 3:
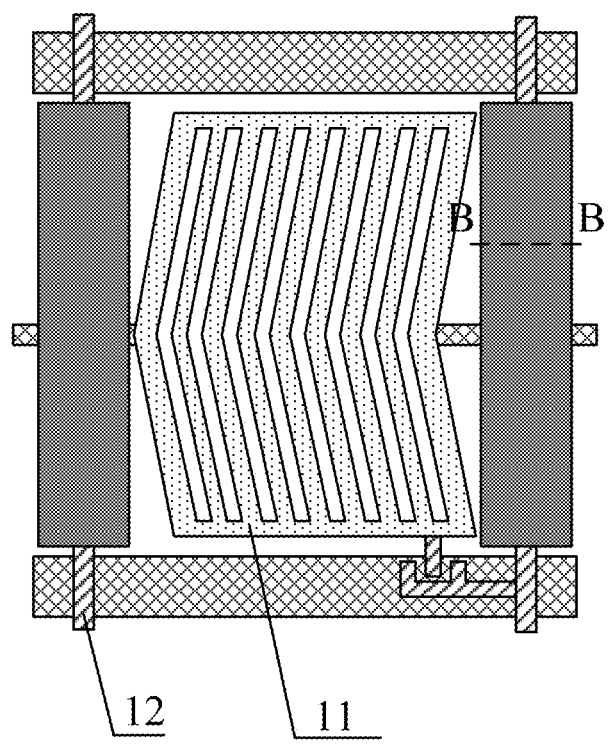
FIG. 3 illustrates a schematic diagram of a display panel in an ADS mode adopting a BPS technique.
Figure 4:
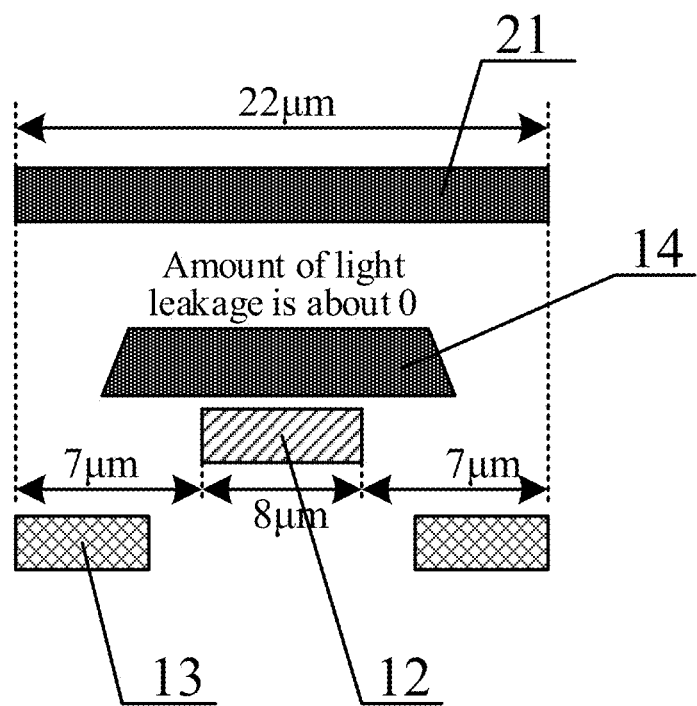
FIG. 4 illustrates a cross-sectional view of B-B in FIG. 3.

In order to reduce light leakage on both sides of the data line and increase the aperture ratio of the display panel, the display panel adopts a BPS On Array technique, that is, a BPS (a black gap control material) technique is adopted on the display substrate. FIG. 3 illustrates a schematic diagram of a display panel in an ADS mode adopting a BPS technique, and FIG. 4 illustrates a cross-sectional view of B-B in FIG. 3. As shown in FIG. 3 and FIG. 4, a separation column 14 made from a BPS material is manufactured on the display substrate, the separation column 14 is located between adjacent pixel regions, and the separation column 14 may function as a spacer. The BPS material is a black resin material, such as a black negative photoresist. A thickness of the separation column is about 2 μm. As shown in FIG. 3 and FIG. 4, a pixel electrode 11, a data line 12 and a common electrode 13 are located on the display substrate, where the pixel electrode 11, the data line 12 and the common electrode 13 are respectively located on different layers. The display substrate is further provided with a separation column 14 above the data line 12 and the common electrode 13. Under the action of the separation column 14, an amount of light leakage on both sides of the data line 12 is about 0. Therefore, compared to the width 31 μm of the black matrix 21 in FIG. 1 and FIG. 2, the width of the black matrix 21 in the display panel shown in FIG. 3 and FIG. 4 can be reduced to 22 μm, thereby greatly increasing the aperture ratio of the display panel.

The principle of increasing the aperture ratio of the display panel by adopting the BPS ON Array technique is briefly described as follows.

1. Liquid crystals in a space above the data line 12 in a liquid crystal layer are replaced with a BPS material (a black resin material), thereby causing a decrease in the amount of the liquid crystals due to electric field disturbance, and further, reducing light leakage in a dark state.

2. Because a dielectric constant (ε=3.5) of the BPS material is lower than a dielectric constant (ε=6.5) of the liquid crystal, the BPS material can play the role of shielding the electric field around the data line 12, so that the disordered electric field is weakened or even disappeared, and the disordered liquid crystal caused by the electric field is weakened or disappeared.

A simulation result: the simulation result shows that the transmittance of a 75 inches and 8K panel can be improved to 60% by adopting the BPS On Array technique.

Figure 5:
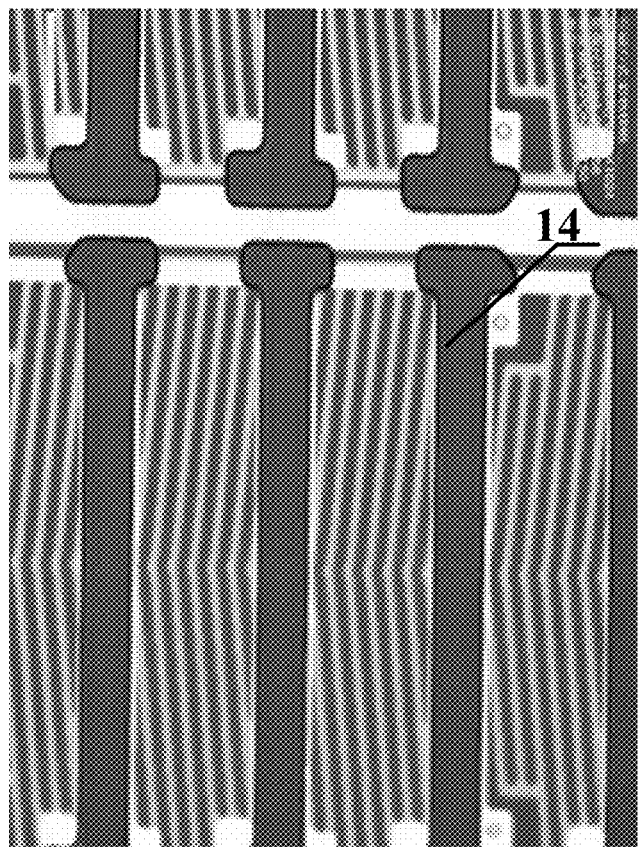
FIG. 5 illustrates a schematic diagram of a separation column before an orientation film is formed on a display substrate in a display panel.
Figure 6:
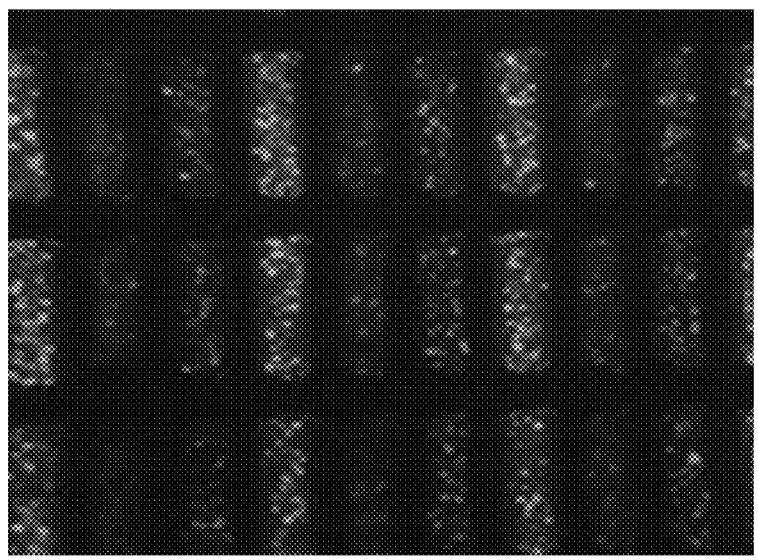
FIG. 6 illustrates a schematic diagram of a display panel including the display substrate shown in FIG. 5 in a dark state.

FIG. 5 illustrates a schematic diagram of a separation column 14 before an orientation film 15 is formed on a display substrate in a display panel, and FIG. 6 illustrates a schematic diagram of a display panel including the display substrate shown in FIG. 5 in a dark state. As shown in FIG. 6, the display panel has a problem of light leakage in the pixel regions in the dark state. Specifically, in the dark state, dotted light leakage is present on the pixel regions densely, which seriously affects the contrast and normal display of the display panel. Through research, the researchers find that the problem of BPS material residue does not occur on the display substrate before the orientation film is formed, and therefore, the researchers propose that the problem of light leakage occurs in an aligning process.

Figure 7:
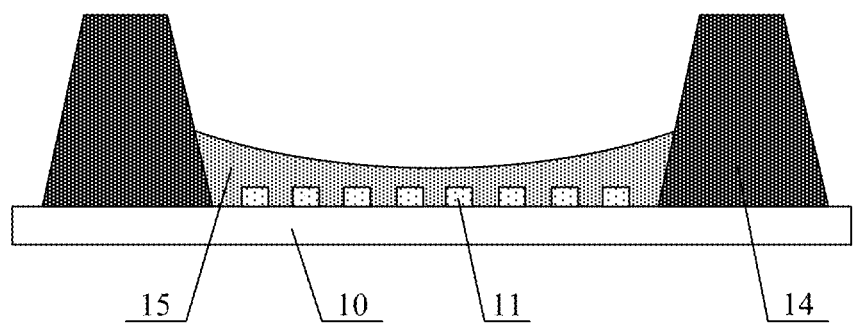
FIG. 7 illustrates a schematic diagram of a display substrate adopting a BPS technique.

FIG. 7 illustrates a schematic diagram of a display substrate adopting a BPS technique. As shown in FIG. 7, the display substrate includes a plurality of pixel regions arranged in an array. The display substrate includes a base 10 and pixel electrodes 11 arranged on the base 10 and located in the pixel regions. The display substrate further includes separation columns 14 that is made from a BPS material, arranged on the base 10 and located on both sides of pixel electrode 11. An orientation film 15 is arranged on the pixel electrode 11. Generally, the orientation film 15 is formed on the pixel electrode 11 by adopting a transfer process.

Figure 8:
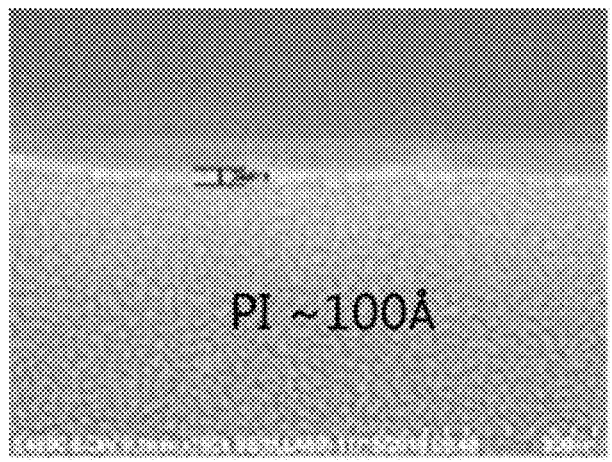
FIG. 8 illustrates a schematic diagram of a middle region of a pixel region after an orientation film is formed by once transfer in the display substrate shown in FIG. 7.
Figure 9:
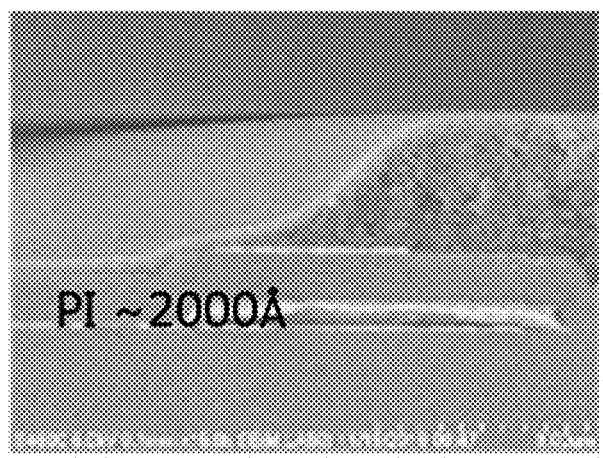
FIG. 9 illustrates a schematic diagram of a side of a separation column after an orientation film is formed by once transfer in the display substrate shown in FIG. 7.
Figure 10:
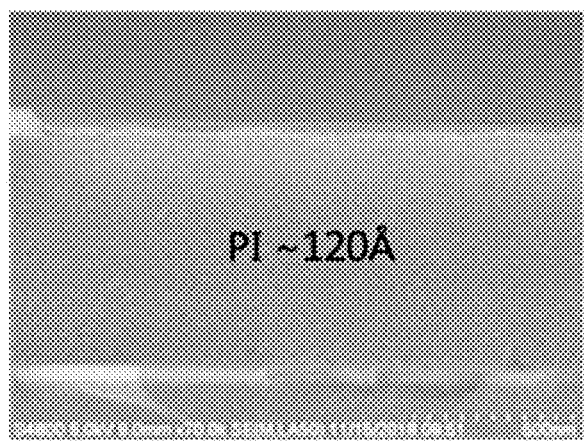
FIG. 10 illustrates a schematic diagram of a middle region of a pixel region after an orientation film is formed by twice transfer in the display substrate shown in FIG. 7.
Figure 11:
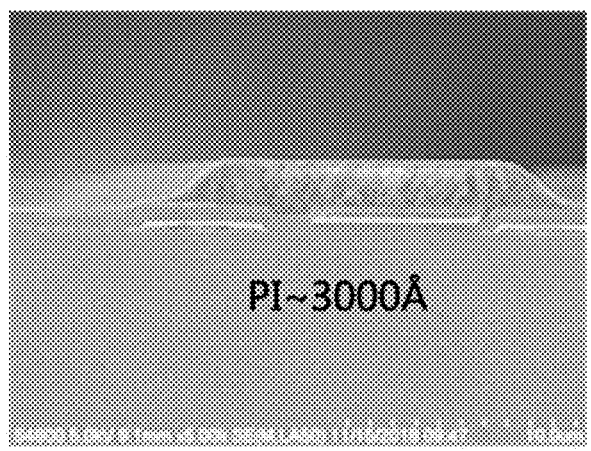
FIG. 11 illustrates a schematic diagram of a side of a separation column after an orientation film is formed by twice transfer in the display substrate shown in FIG. 7.

FIG. 8 illustrates a Scanning Electron Microscope (SEM) picture of a middle region of a pixel region after an orientation film is formed by once transfer in the display substrate shown in FIG. 7; FIG. 9 illustrates a SEM picture of a side of a separation column after an orientation film is formed by once transfer in the display substrate shown in FIG. 7; FIG. 10 illustrates a SEM picture of a middle region of a pixel region after an orientation film is formed by twice transfer in the display substrate shown in FIG. 7; and FIG. 11 illustrates a SEM picture of a side of a separation column after an orientation film is formed by twice transfer in the display substrate shown in FIG. 7.

As shown in FIG. 7, generally, when the thickness of the orientation film 15 in the display substrate is greater than 600 angstroms, the contrast and normal display of the display panel can be ensured. In practice, the thickness of the orientation film 15 is expected to reach 900 angstroms. Through research, the researchers find that as shown in FIGS. 8-11, when the orientation film 15 is formed by adopting once transfer process, the thickness of the orientation film 15 located in middle of the pixel region is about 100 angstroms, and the thickness of the orientation film 15 located on the side of the separation column 14 (i.e., a position where the orientation film 15 is close to the separation column 14) is about 2000 angstroms. Due to the limited space for adjusting the thickness of the orientation film 15 in the transfer process, the thickness of the orientation film 15 can only be adjusted by increasing the application number of the transfer process. However, through research, the researchers find that when the orientation film 15 is formed by adopting twice transfer processes, the thickness of the alignment film 15 located in middle of the pixel region is about 120 angstroms, and the thickness of the orientation film 15 located on the side of the separation column 14 (i.e., a position where the orientation film 15 is close to the separation column 14) is about 3000 angstroms. Therefore, the method of increasing the application number of the transfer process cannot effectively increase the thickness of the orientation film 15 in middle of the pixel region, but instead causes accumulation of the orientation film 15 on both sides of the separation column 14.

Figure 12:
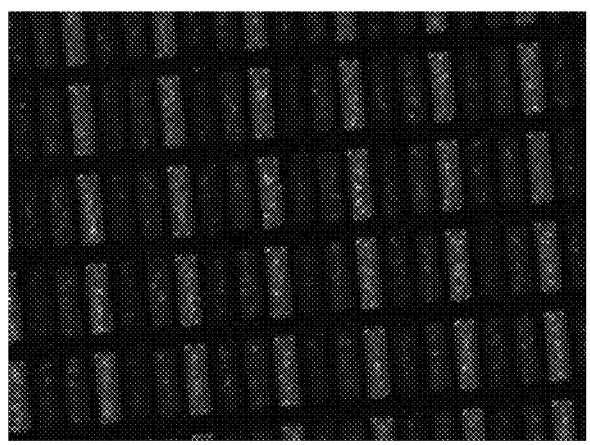
FIG. 12 illustrates a schematic diagram of a display panel in a dark state after an orientation film is formed by once transfer.
Figure 13:
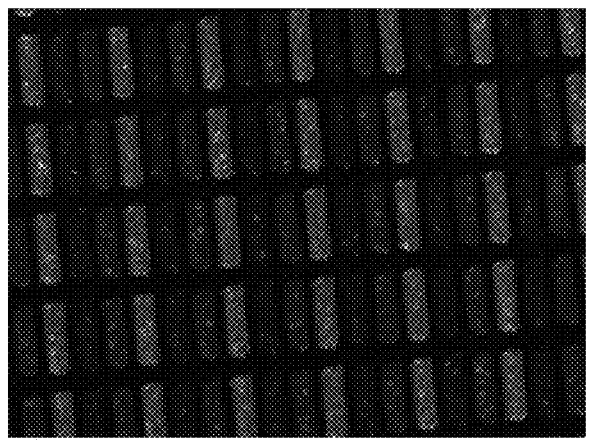
FIG. 13 illustrates a schematic diagram of a display panel in a dark state after an orientation film is formed by twice transfer.

FIG. 12 illustrates a schematic diagram of a display panel in a dark state after an orientation film 15 is formed by once transfer, and FIG. 13 illustrates a schematic diagram of a display panel in a dark state after an orientation film 15 is formed by twice transfer. By comparing FIG. 12 with FIG. 13, the problem of light leakage is not improved by twice transfer to form the orientation film 15, as compared with once transfer to form the orientation film 15.

As shown in FIGS. 8 and 9, the thickness of the orientation film 15 in middle of the pixel region is about 100 angstroms, and the thickness of the orientation film 15 at a position close to the separation column 14 is about 2000 angstroms, which is about 20 times different in thickness. Through further research, the researchers find that with the display substrate structure shown in FIG. 7, when the orientation film 15 is formed in the pixel region, the thickness of the orientation film 15 cannot be greater than 600 angstroms easily. Thus, after a groove is formed by rubbing the orientation film 15, a riveting force of the orientation film 15 in the pixel region is insufficient, which causes disorder of the liquid crystal in the pixel region, thereby having the problem of dotted light leakage in the pixel region, and resulting in abnormal display.

In order to solve the above-mentioned technical problems, an embodiment of the present disclosure proposes a display substrate. The display substrate includes a plurality of pixel regions arranged in an array. The display substrate includes: a base; pixel electrodes arranged on the base and located in the pixel regions; spacers arranged on the base and each located between two adjacent pixel regions in a row direction, where side surfaces of the spacers have hydrophobic characteristics; and orientation films arranged on the pixel electrodes and located in the pixel regions, where edges of two opposite sides, in the row direction, of an orientation film arranged in a pixel region are in contact with side surfaces of spacers adjacent to the pixel region, and a surface on a side, facing away from the base, of the orientation film has a shape of gradually protruding from both sides toward the middle in the row direction.

In the above display substrate provided in the embodiment of the present disclosure, an upper surface of the formed orientation film has a shape of gradually protruding from both sides toward the middle, which makes the thickness of the middle position of the orientation film greater than the thickness of both sides of the orientation film, that is, the thickness of the orientation film at the middle position of the pixel region is greater than the thickness on both sides. Therefore, it is easier to form an orientation film with a greater thickness in the pixel region, and it is very easy to cause the thickness of the orientation film in the pixel region to reach more than 600 angstroms. Furthermore, when a groove is formed by rubbing, a good rubbing effect can be formed in the pixel region, thereby improving the riveting force of the orientation film in the pixel region, preventing the liquid crystal in the pixel region from being disorderly, further preventing the problem of light leakage and display abnormality, and improving display contrast and display quality.

Figure 14:
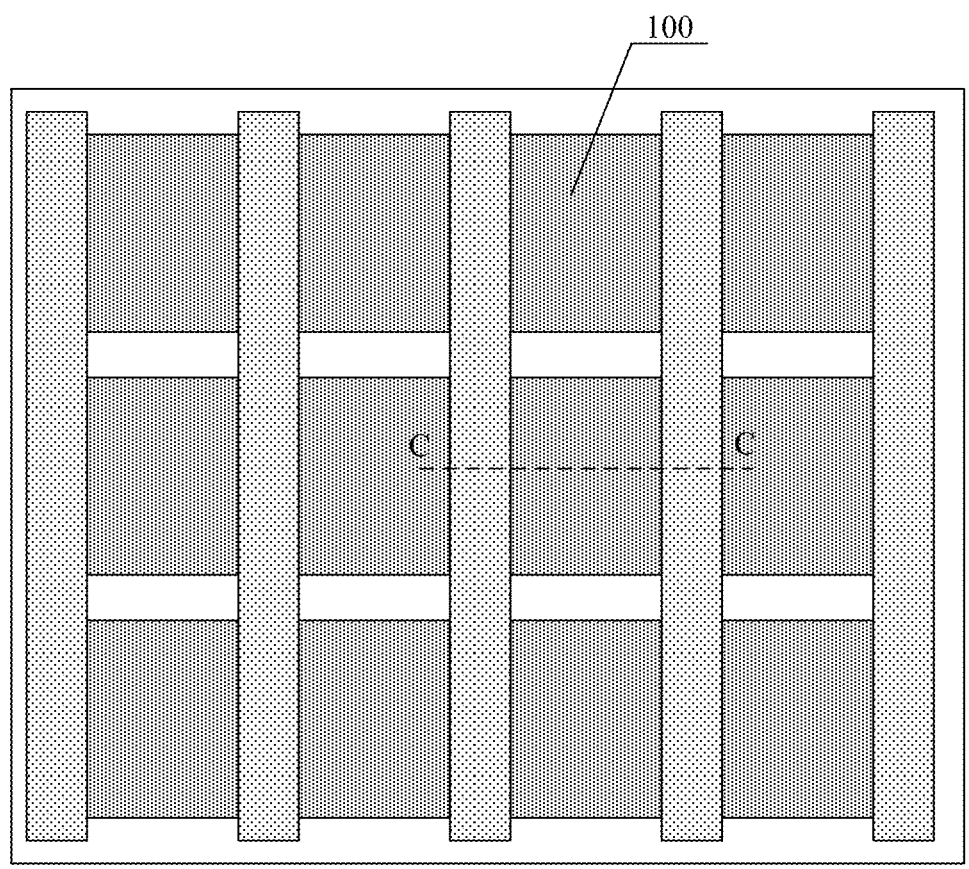
FIG. 14 illustrates a schematic top view of a display substrate according to a first embodiment of the present disclosure.
Figure 15:
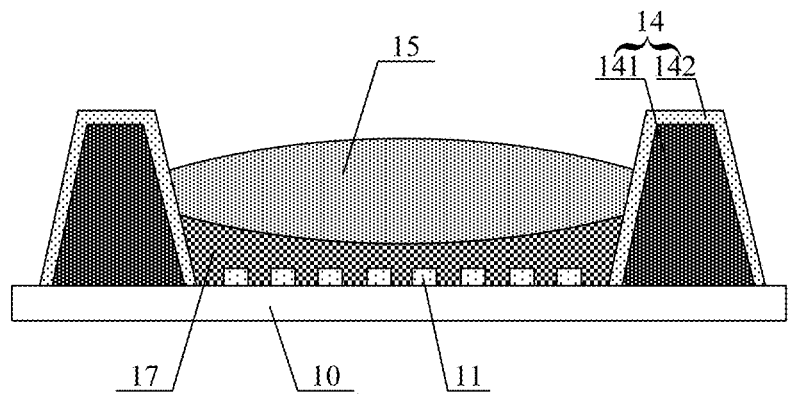
FIG. 15 illustrates a cross-sectional view of C-C in FIG. 14.

FIG. 14 illustrates a schematic top view of a display substrate according to an embodiment of the present disclosure, and FIG. 15 illustrates a cross-sectional view of C-C in FIG. 14. As shown in FIG. 14 and FIG. 15, the display substrate includes a plurality of pixel regions 100 arranged in an array. The display substrate includes a base 10 and pixel electrodes 11 arranged on the base 10 and located in the pixel regions 100. The display substrate adopts the BPS technique. Therefore, the display substrate further includes a separation column 14 arranged on the base 10 and located between two adjacent pixel regions 100 in a row direction, and a side surface of the separation column 14 has hydrophobic characteristics. The display substrate further includes an orientation film 15 arranged on the pixel electrode 11, and the orientation film 15 is located in each of the pixel regions. Edges of two opposite sides of the orientation film 15 in the row direction are in contact with a side surface of the separation column 14, and a surface on a side, facing away from the base 10, of the orientation film 15 has a shape of gradually protruding from both sides toward the middle in the row direction.

It is easy to understand that the material of the orientation film 15 is generally a polyimide solution with hydrophilic properties. According to the display substrate in the embodiment of the present disclosure, the side surface of the separation column 14 is configured to have hydrophobic characteristics. Thus, when the polyimide solution is formed in the pixel region between the separation columns 14, an upper surface of the polyimide solution has a shape of gradually protruding from both sides toward the middle in the row direction, so that the upper surface of the orientation film 15 also has a shape of gradually protruding from both sides toward the middle in the row direction. This makes the thickness of the middle position of the orientation film 15 greater than the thickness of both sides of the orientation film 15, and the thickness of the orientation film 15 tends to gradually increase from both sides toward the middle in the row direction, that is, the thickness of the orientation film 15 at the middle position of the pixel region is greater than the thickness on both sides. Compared with the structure shown in FIG. 7, it is easier to form an orientation film with a greater thickness in the pixel region, and it is very easy to cause the thickness of the orientation film 15 in the pixel region to reach 600 angstroms or above. Furthermore, when a groove is formed by rubbing, a good rubbing effect can be formed in the pixel region, thereby improving the riveting force of the orientation film in the pixel region, preventing liquid crystals in the pixel regions from being disorderly, further preventing the problem of light leakage and display abnormality, and improving display contrast and display quality.

It is easy to understand that the display substrate may further include a thin film transistor and a passivation layer arranged between the base 10 and the pixel electrode 11. The pixel electrode 11 is located on the passivation layer, and is electrically connected to a source electrode or a drain electrode of the thin film transistor through a via hole passing through the passivation layer.

As shown in FIG. 15, in order to cause the side surface of the separation column to have hydrophobic characteristics, the separation column 14 may include a BPS layer 141 arranged on the base 10 and a hydrophobic material layer 142 arranged on an outer surface of the BPS layer 141. The hydrophobic material layer 142 causes the side surface of the separation column 14 to have hydrophobic characteristics.

Of course, it is also possible to cause the side surface of the separation column to have hydrophobic characteristics in other ways. For example, the outer surface of the separation column may be subjected to hydrophobic treatment, etc.

Figure 16:
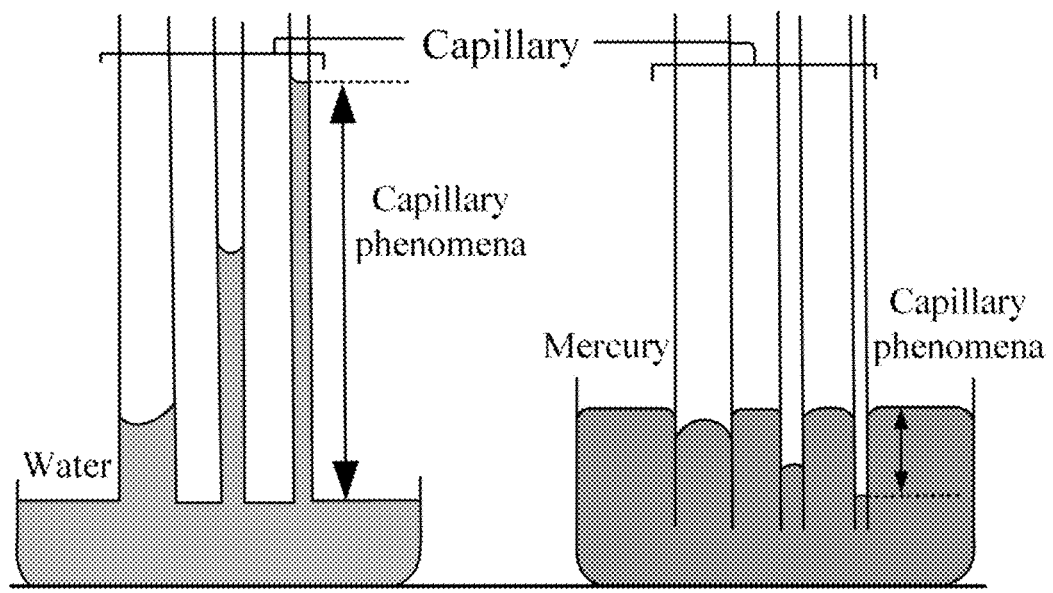
FIG. 16 illustrates a schematic diagram of capillary phenomena.

FIG. 16 illustrates a schematic diagram of capillary phenomena. As shown in FIG. 16, in the phenomenon that occurs in some capillaries whose linearity is small enough to be comparative with the radius of curvature of liquid meniscus, the entire liquid surface in the capillaries becomes curved, and the interaction between liquid and solid molecules can extend to the entire liquid. Capillary phenomena are common in daily life, for example, water rises in a thin glass tube because water can wet glass; conversely, mercury drops in the thin glass tube because mercury cannot wet glass. The reason lies in the liquid surface tension and the pressure difference between the inside and outside of a curved surface. As shown in FIG. 7, the BPS material is an acrylic resin material containing a large amount of propylene glycol, and is a hydrophilic material; and a contact angle of the BPS material with water is about 60°-70°. The BPS material may be a black resin material, such as a black negative photoresist. A polyimide (PI) solution is a typical hydrophilic material, and the contact angle of the PI solution is about 80°. Therefore, in FIG. 7, when the PI solution is coated between two separation columns made from the BPS material, an interface of the PI solution with the separation columns made from the BPS material is a wet interface, similar to an interface with water, so that the upper surface of the PI solution has a shape of gradually recessing from both sides toward the middle. Thus, the thickness of the orientation film 15 at a position close to the separation column 14 is greater than the thickness of the orientation film 15 at a middle position.

In an embodiment of the present disclosure, a side surface of the separation column 14 has hydrophobic characteristics. Thus, when the PI solution is formed in the pixel region, the interface between the PI solution and the separation column 14 is a non-wet interface, so that the upper surface of the formed orientation film 15 has a shape of gradually protruding from both sides toward the middle. Thus, the thickness of the orientation film 15 at a middle position of the pixel region is greater than the thickness on both sides.

In some embodiments, a material of the hydrophobic material layer 142 may include Teflon. The Teflon has strong hydrophobic characteristics, and can form a strong hydrophobic interface on the outer surface of the BPS layer 141, so that the hydrophilic PI solution can form an interface that is thick in the middle and thin in both sides due to capillary action, so it is conducive to the formation of the orientation film 15 having the structure shown in FIG. 15. Thus, it is easier to form a good rubbing effect in the pixel region when a groove is formed by rubbing.

Figure 17:
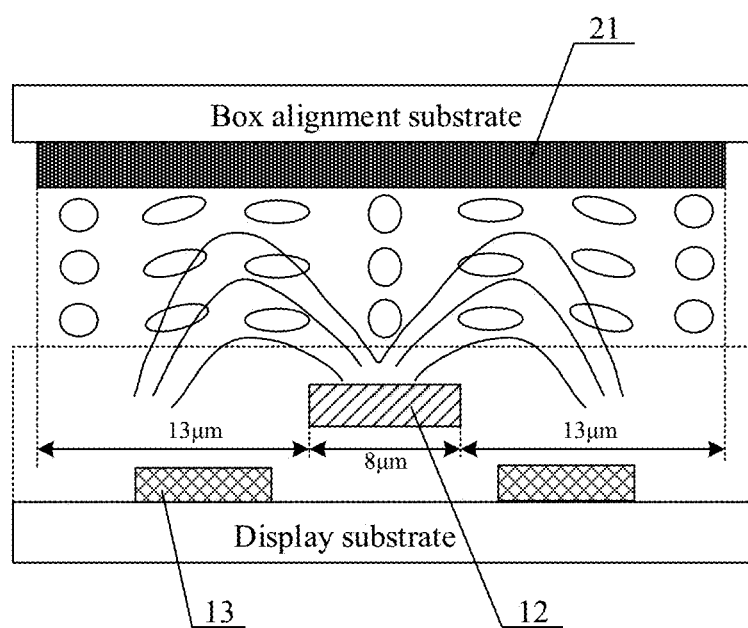
FIG. 17 illustrates a schematic diagram of a working state of the display panel shown in FIG. 2.

FIG. 17 illustrates a schematic diagram of a working state of the display panel shown in FIG. 2. As shown in FIG. 17, a voltage difference is present between the data line 12 and the common electrode 13. Therefore, an electric field is formed between the data line 12 and the common electrode 13, causing light leakage on both sides of the data line 12.

Figure 18A:
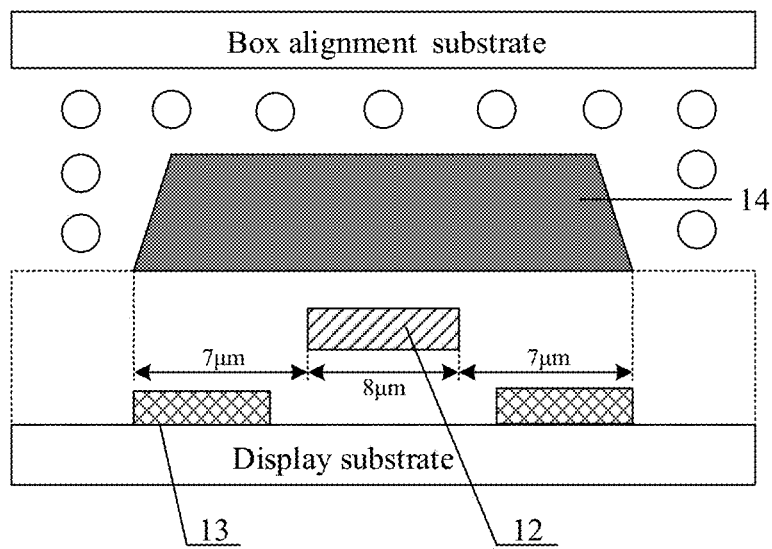
FIG. 18a illustrates a schematic diagram of a working state of the display panel adopting a BPS technique.
Figure 18B:
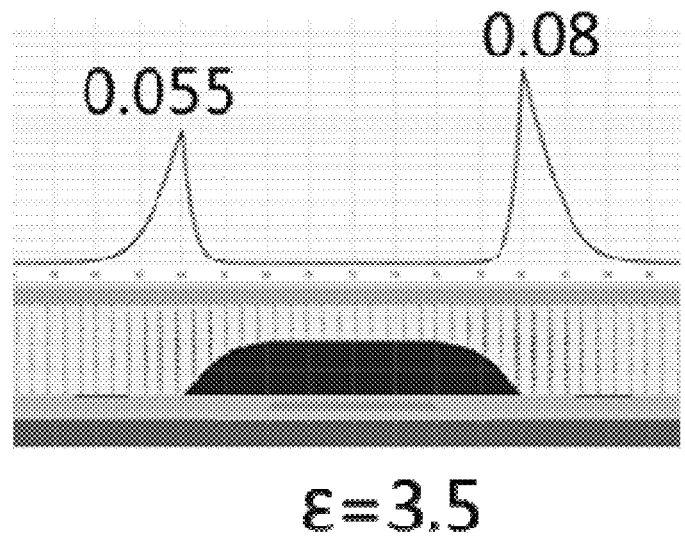
FIG. 18b illustrates a schematic diagram of an amount of light leakage of the display panel shown in FIG. 18a when a separation column is made from a BPS material.
Figure 18C:
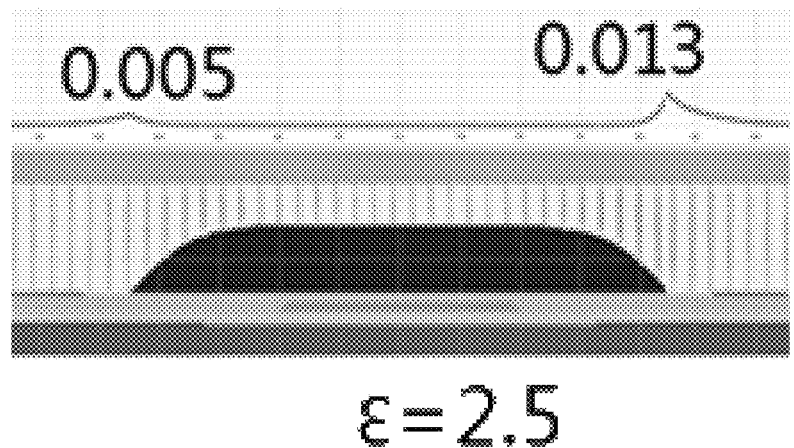
FIG. 18c illustrates a schematic diagram of an amount of light leakage of the display panel shown in FIG. 18a when a separation column according to an embodiment of the present disclosure is used.

FIG. 18a illustrates a schematic diagram of a working state of the display panel adopting a BPS technique; FIG. 18b illustrates a schematic diagram of an amount of light leakage of the display panel when a separation column 14 is made from a BPS material; and FIG. 18c illustrates a schematic diagram of the amount of light leakage of the display panel when adopting a separation column according to an embodiment of the present disclosure. As shown in FIG. 18a, the separation column 14 includes the BPS material, and the separation column 14 can function as a black matrix. Therefore, in the display panel shown in FIG. 18a, the color film substrate may not be provided with a black matrix. Although the amount of light leakage of the display panel is greatly reduced compared to the amount in FIG. 17, when the separation column is made from the BPS material, a dielectric constant of the BPS material is about 3.5, so that there is still slight light leakage on both sides of the separation column 14, as shown in FIG. 18b. When the display panel adopts the separation column 14 in the display substrate according to an embodiment of the present disclosure, the separation column 14 includes a BPS layer 141 and a hydrophobic material layer 142 arranged on an outer surface of the BPS layer 141. The BPS layer 141 can block light, so that the separation column 14 can function as a black matrix. A material of the hydrophobic material layer 142 includes a Teflon material. A dielectric constant of the Teflon material is less than 2.1, and the dielectric constant of the BPS material is about 3.5. Compared with the BPS material, the Teflon material has a smaller dielectric constant, the hydrophobic material layer 142 including the Teflon material can better shield the BPS layer, so that the dielectric constant of the separation column 14 is reduced to about 2.5, thus avoiding poor display caused by the orientation of the electric field at the bottom corner of the separation column 14. Compared with FIG. 18b, the light leakage on both sides of the separation column is further reduced as shown in FIG. 18c. The amount of light leakage on both sides of the separation column 14 shown in FIG. 18c is greatly reduced compared to the amount of light leakage on both sides of the separation column 14 shown in FIG. 18b.

In order to further increase the thickness of the orientation film 15 at the middle position of the pixel region, as shown in FIG. 15, the display substrate may further include an adjustment layer 17 located in each of the pixel regions, the adjustment layer 17 is arranged between the pixel electrode 11 and the orientation film 15, and edges of two opposite sides of the adjustment layer 17 in the row direction are in contact with the side surfaces of the separation columns 14. A surface, in contact with the orientation film 15, of the adjustment layer 17 has a shape of gradually recessing from both sides toward the middle in the row direction.

Specifically, a surface on a side, facing the orientation film, of the adjustment layer 17 is gradually recessed from both sides toward the middle, that is, an upper surface of the adjustment layer 17 is concave, as shown in FIG. 15, and a thickness of the adjustment layer 17 tends to gradually decrease from both sides toward the middle in the row direction. Thus, when the orientation film 15 is formed on the adjustment layer 17, the thickness of the middle position of the orientation film 15 can be further increased. Thus, it is more conducive to forming an orientation film 15 with a thickness greater than 600 angstroms in the pixel region, and it is more conducive to forming a good rubbing effect in the pixel region, further improving the riveting force of the orientation film 15 in the pixel region, and avoiding disorder of the liquid crystals in the pixel region. In addition, the arrangement of the adjustment layers 17 can avoid the poor liquid crystal orientation caused by surface burrs of the pixel electrodes 11, and improve the display effect.

In some embodiments, the material of the adjustment layer 17 may be a hydrophobic material, the material of the adjustment layer 17 is a long chain molecule, and the material of the adjustment layer 17 is a material containing a large amount of lipid groups. Therefore, the adjustment layer 17 and the hydrophobic material layer 16 containing Teflon have good wettability. Thus, the surface on a side, facing the orientation film 15, of the adjustment layer 17 has a shape of gradually recessing from both sides toward the middle.

In some embodiments, the display panel adopting the display substrate according to the embodiments of the present disclosure is a display panel in an ADS mode.

On the basis of the same inventive concept, an embodiment of the present disclosure further provides a preparation method for a display substrate as shown in FIG. 15, the display substrate includes a plurality of pixel regions 100 arranged in an array, and the preparation method includes the following steps:

S1: forming pixel electrodes located in pixel regions on a base, and forming spacers each between two adjacent pixel regions in a row direction on the base, side surfaces of the spacers have hydrophobic characteristics; and S2: forming orientation films located on the pixel electrodes in the pixel regions; where edges of two opposite sides, in the row direction, of an orientation film arranged in a pixel region are in contact with side surfaces of spacers adjacent to the pixel region; and a surface on a side, facing away from the base, of the orientation film has a shape of gradually protruding from both sides toward the middle in the row direction.

In some embodiments, the step of forming the spacers each located between two adjacent pixel regions in the row direction on the base, the side surfaces of the spacers having hydrophobic characteristics, specifically includes:

forming BPS layers located each between two adjacent pixel regions in the row direction on the base; and forming hydrophobic material layers on outer surfaces of the BPS layers.

A material of the hydrophobic material layer may include Teflon.

In some embodiments, before the above step S2, the preparation method may further include:

forming adjustment layers on the pixel electrodes located in pixel regions; where edges of two opposite sides, in the row direction, of an adjustment layer arranged in the pixel region are in contact with the side surfaces of the spacers adjacent to the pixel region; and a surface, in contact with the orientation film, of the adjustment layer has a shape of gradually recessing from both sides toward the middle in the row direction.

A material of the adjustment layer may include a hydrophobic material.

In some embodiments, the orientation film may be formed through a transfer process.

In some embodiments, the above step S1 may specifically include:

S11: forming the pixel electrodes located in the pixel regions on the base;

S12: forming the BPS layers each between two adjacent pixel regions in the row direction on the base; and S13: forming the hydrophobic material layers covering the outer surfaces of the BPS layers on the BPS layers.

It is easy to understand that, in other embodiments, in S1, the BPS layer, the hydrophobic material layer and the pixel electrode may be sequentially formed, or the BPS layer, the pixel electrode and the hydrophobic material layer may be sequentially formed. Therefore, in specific implementation, the order of forming the BPS layer, the hydrophobic material layer and the pixel electrode is not limited, as long as the structure shown in FIG. 15 can be formed.

In some embodiments, the step of forming the orientation films on the adjustment layers may include:

S21: forming first sub-orientation films located in the pixel regions on the adjustment layers through an imprinting process;

S22: forming polyimide solutions on the first sub-orientation films through a transfer process; and S23: forming the orientation films by heating the first sub-orientation film and the polyimide solutions.

The temperature needed for heating the first sub-orientation film and the polyimide solution can be selected according to actual needs, and is usually 180° C. to 250° C.

The preparation method for the display substrate provided in the embodiments of the present disclosure will be described in detail below with the specific process of preparing the display substrate. The "patterning process" mentioned in the embodiments includes treatments such as photoresist coating, mask exposure, developing, etching, and photoresist stripping, and is an existing mature preparation process. The coating can adopt a known coating process, which is not specifically limited herein.

Figure 19A:
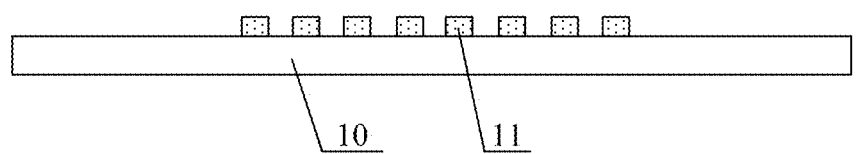
FIG. 19a illustrates a schematic diagram after pixel electrode is formed in a display substrate.
Figure 19B:
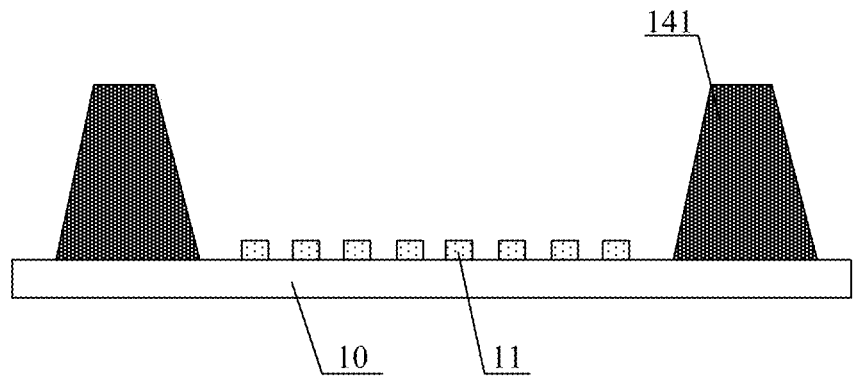
FIG. 19b illustrates a schematic diagram after a BPS layer is formed in the display substrate.
Figure 19C:
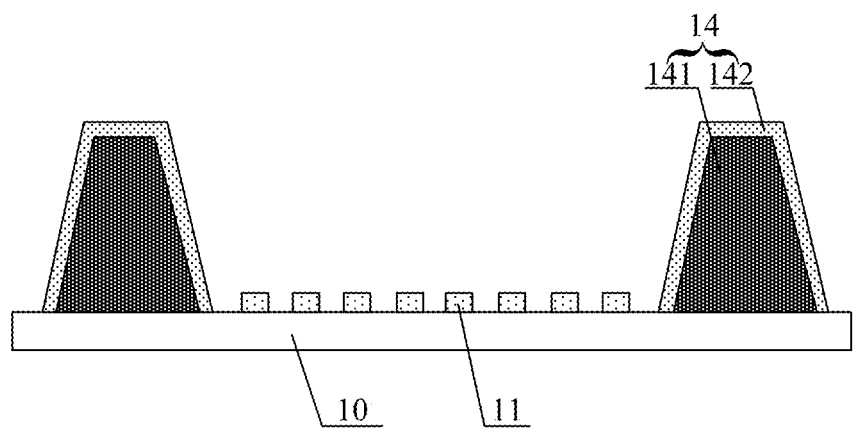
FIG. 19c illustrates a schematic diagram after a hydrophobic material layer is formed in the display substrate.
Figure 19D:
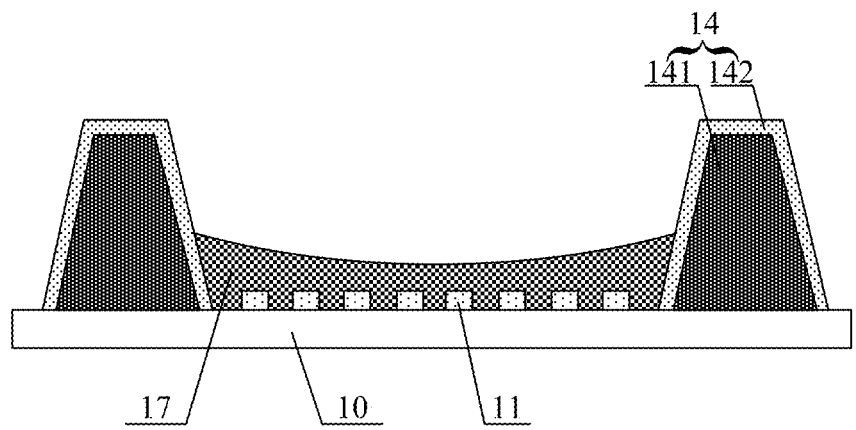
FIG. 19d illustrates a schematic diagram after an adjustment layer is formed in the display substrate.

FIG. 19a illustrates a schematic diagram after pixel electrode is formed in a display substrate; FIG. 19b illustrates a schematic diagram after a BPS layer is formed in the display substrate; FIG. 19c illustrates a schematic diagram after a hydrophobic material layer is formed in the display substrate; and FIG. 19d illustrates a schematic diagram after an adjustment layer is formed in the display substrate.

Pixel electrodes 11 located in pixel regions 100 are formed on a base 10. Specifically, a pixel electrode film is formed on the base 10, and the pixel electrodes 11 located in the pixel regions are formed through a patterning process, as shown in FIG. 19a. A material of the pixel electrodes 11 may include indium tin oxide.

A BPS layer 141 located between two adjacent pixel regions in the row direction is formed on the base 10. Specifically, a BPS film is formed on the base 10 on which the pixel electrode 11 is formed, and the BPS film is coated with a layer of photoresist; the photoresist is exposed and developed by adopting a single-tone mask, an unexposed region is formed at a pattern position of the BPS layer to retain the photoresist, and a fully exposed region is formed at other positions without the photoresist and BPS film; and the remaining photoresist is stripped to form the BPS layer, as shown in FIG. 19b. A material of the BPS layer 141 is the BPS material.

A hydrophobic material layer 142 covering an outer surface of the BPS layer 141 is formed on the BPS layer 141. Specifically, a hydrophobic material film is formed on the base 10 on which the BPS layer 141 is formed, and the hydrophobic material film is coated with a layer of photoresist; the photoresist is exposed and developed by adopting a single-tone mask, and the remaining photoresist is stripped to form the hydrophobic material layer 142 covering the outer surface of the BPS layer 141, as shown in FIG. 19c. A material of the hydrophobic material film includes Teflon.

An adjustment layer 17 located in each of the pixel regions is formed on the base 10. Specifically, the adjustment layer 17 on the pixel electrode 11 in each of the pixel regions is formed by a coating process, as shown in FIG. 19d. A material of the adjustment layer is a hydrophobic material, the material of the adjustment layer 17 is a long chain molecule, and the material of the adjustment layer 17 is a material containing a large amount of lipid groups. For example, the material of the adjustment layer 17 may include polyacrylonitrile or polycarbonate, etc. Each pixel region can be coated with a polyacrylonitrile solution or a polycarbonate solution or the like to form the adjustment layer 17 after evaporation of a solvent component. The material of the adjustment layer 17 has hydrophobic characteristics. Therefore, the hydrophobic material solution forming the adjustment layer 17 and the hydrophobic material layer 142 containing Teflon have good wettability. Thus, when the adjustment layer 17 is formed by coating the pixel region, both sides of the adjustment layer 17 are in contact with the hydrophobic material layer 142, and the upper surface of the adjustment layer 17 is concave, that is, the upper surface of the adjustment layer 17 has a shape of gradually recessing from both sides toward the middle.

A first sub-orientation film located in each of the pixel regions is formed on the adjustment layer 17 through an imprinting process. Specifically, the first sub-orientation film is formed on the adjustment layer 17 through the imprinting process.

A polyimide solution is formed on the first sub-orientation film through the transfer process, and the first sub-orientation film and the polyimide solution are heated to evaporate the solvent component to form the orientation film 15, as shown in FIG. 15. A material of the orientation film is polyimide, both sides of the orientation film are in contact with the hydrophobic material layer, and the surface, facing away from the pixel electrode 11, of the orientation film (i.e., the upper surface of the orientation film 15) has a shape of gradually protruding from both sides toward the middle.

On the basis of the same inventive concept, an embodiment of the present disclosure further provides a display panel. The display panel includes the display substrate provided in the foregoing embodiments, and a box alignment substrate arranged opposite to the display substrate. Specifically, the display substrate may be an array substrate, and the box alignment substrate may be a color film substrate. The color film substrate includes a second base, and a color film layer arranged on the second base and corresponding to the pixel regions. The color film layer may include a blue color film, a green color film and a red color film. The color film substrate further includes a protective layer and the like arranged on the color film layer.

On the basis of the same inventive concept, an embodiment of the present disclosure further provides a display device. The display device includes the display panel provided in the foregoing embodiments. The display device can be any product or component with a display function, such as a mobile phone, a tablet personal computer, a television, a display, a notebook computer, a digital photo frame and a navigator.

In the description of the embodiments of the present disclosure, it is to be understood that an azimuth or positional relationship indicated by terms "middle", "upper", "lower", "front", "back", "vertical", "horizontal", "top", "bottom", "inside", "outside" and the like is based on the azimuth or positional relationship shown in the accompanying drawings, and is merely for the purpose of facilitating the description of the present disclosure and simplifying the description, rather than indicating or implying that the device or element referred to must have a specific azimuth or be constructed and operated in a particular azimuth, therefore it cannot be construed as a limitation to the present disclosure.

In the description of the embodiments of the present disclosure, it should be noted that the terms "mount", "connect", "connection" should be broadly understood unless otherwise specified and defined, for example, it may be a fixed connection or a removable connection, or an integral connection, or a mechanical connection or an electrical connection, or a direct connection, or an indirect connection through an intermediate medium, or an internal connection between two elements. For those of ordinary skill in the art, the specific meanings of the above terms in the present disclosure may be interpreted according to particular situations.

Although the implementations of the present disclosure have been disclosed above, the described contents are merely the implementations employed for understanding the present disclosure conveniently and are not intended to limit the present disclosure. Any modification and variation in the implementing form and details may be made by those skilled in the art without departing from the disclosed spirit and scope of the present disclosure. However, the scope of patent protection of the present disclosure is to be determined by the appended claims.

What is claimed is:

1. A display substrate, comprising:
   a base comprising a plurality of pixel regions arranged in an array;
   pixel electrodes arranged in the pixel regions;
   spacers each arranged between two adjacent pixel regions in a row direction, wherein side surfaces of the spacers have hydrophobic characteristics; and
   orientation films arranged in the pixel regions and on a side, facing away from the base, of the pixel electrodes;
   wherein edges of two opposite sides, in the row direction, of an orientation film arranged in a pixel region are in contact with side surfaces of spacers adjacent to the pixel region, and
   a surface on a side, facing away from the base, of the orientation film has a shape of gradually protruding from both sides toward a middle position in the row direction.

2. The display substrate according to claim 1, wherein a thickness of the orientation film tends to gradually increase from both sides toward the middle position in the row direction.

3. The display substrate according to claim 1, wherein each of the spacers comprises:
   a Black Photo Spacer (BPS) layer arranged on the base, and
   a hydrophobic material layer arranged on an outer surface of the BPS layer.

4. The display substrate according to claim 3, wherein a material of the hydrophobic material layer comprises Teflon.

5. The display substrate according to claim 1, wherein the display substrate further comprises:
   adjustment layers arranged in the pixel regions and between the pixel electrodes and the orientation films;
   wherein edges of two opposite sides, in the row direction, of an adjustment layer arranged in the pixel region are in contact with the side surfaces of the spacers adjacent to the pixel region, and
   a surface, in contact with the orientation film, of the adjustment layer has a shape of gradually recessing from both sides toward the middle position in the row direction.

6. The display substrate according to claim 5, wherein a thickness of the adjustment layer tends to gradually decrease from both sides toward the middle position in the row direction.

7. The display substrate according to claim 5, wherein a material of the adjustment layer comprises a hydrophobic material.

8. The display substrate according to claim 1, wherein each of the pixel electrodes comprises a plurality of electrode strips arranged at intervals.

9. A method for preparing a display substrate, comprising:
   forming pixel electrodes in pixel regions on a base;
   forming spacers each between two adjacent pixel regions in a row direction, wherein side surfaces of the spacers have hydrophobic characteristics; and
   forming orientation films arranged on the pixel electrodes in the pixel regions;
   wherein edges of two opposite sides, in the row direction, of an orientation film arranged in a pixel region are in contact with side surfaces of spacers adjacent to the pixel region, and
   a surface on a side, facing away from the base, of the orientation film has a shape of gradually protruding from both sides toward a middle position in the row direction.

10. The method according to claim 9, wherein the forming the spacers each between the two adjacent pixel regions in the row direction specifically comprises:
    forming Black Photo Spacer (BPS) layers each between the two adjacent pixel regions in the row direction; and
    forming hydrophobic material layers on outer surfaces of the BPS layers.

11. The method according to claim 10, wherein a material of the hydrophobic material layer comprises Teflon.

12. The method according to claim 9, wherein the orientation film is formed by a transfer process.

13. The method according to claim 9, wherein the forming the orientation films arranged on the pixel electrodes in the pixel regions specifically comprises:
    forming first sub-orientation films on the pixel electrodes arranged in the pixel regions by an imprinting process;
    forming polyimide solutions on the first sub-orientation films by a transfer process; and
    forming the orientation films by heating the first sub-orientation films and the polyimide solutions.

14. The method according to claim 9, wherein before forming the orientation films arranged on the pixel electrodes in the pixel regions, the method further comprises:
    forming adjustment layers on the pixel electrodes in the pixel regions;
    wherein edges of two opposite sides, in the row direction, of an adjustment layer arranged in the pixel region are in contact with the side surfaces of the spacers adjacent to the pixel region, and
    a surface, in contact with the orientation film, of the adjustment layer has a shape of gradually recessing from both sides toward the middle position in the row direction.

15. The method according to claim 14, wherein a material of the adjustment layer comprises a hydrophobic material.

16. The method according to claim 14, wherein the adjustment layer is formed by adopting a coating process.

17. A display panel, comprising the display substrate according to claim 1.

18. A display device, comprising the display panel according to claim 17.

* * * * *